C. E. NABB.
BALING PRESS.
APPLICATION FILED NOV. 19, 1912.

1,096,051.

Patented May 12, 1914.
3 SHEETS—SHEET 1.

Witnesses
W. C. Fielding
H. M. Fest

Inventor
C. E. Nabb,
By
Attorneys

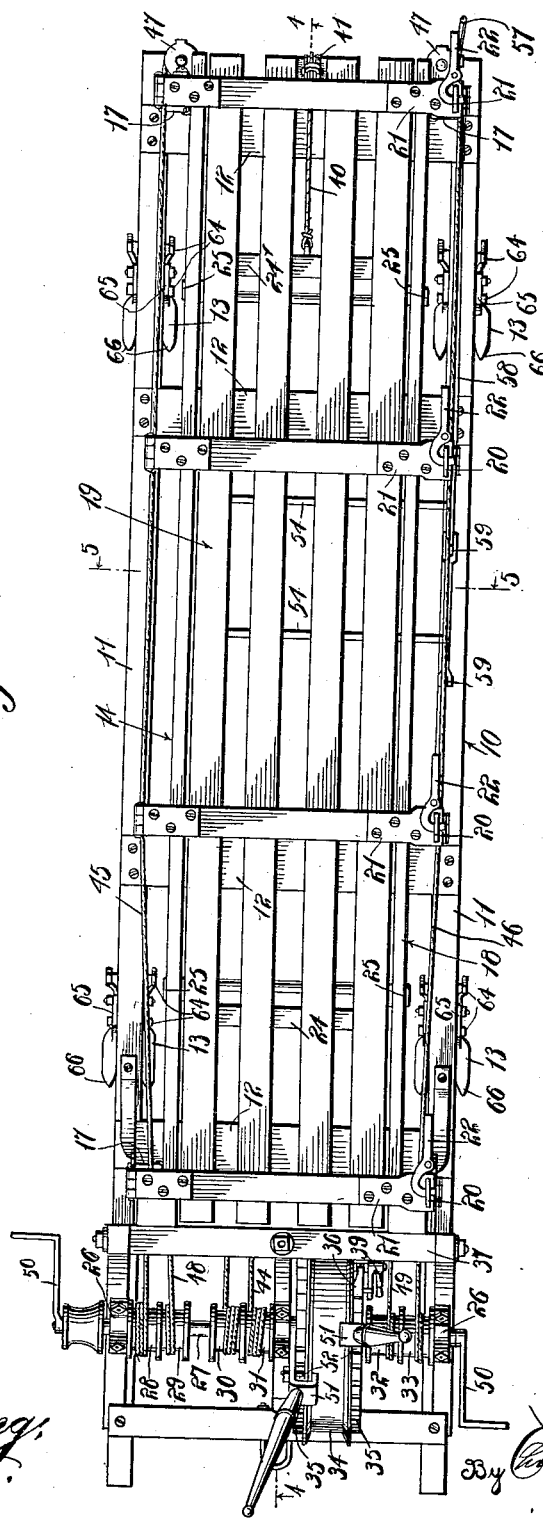

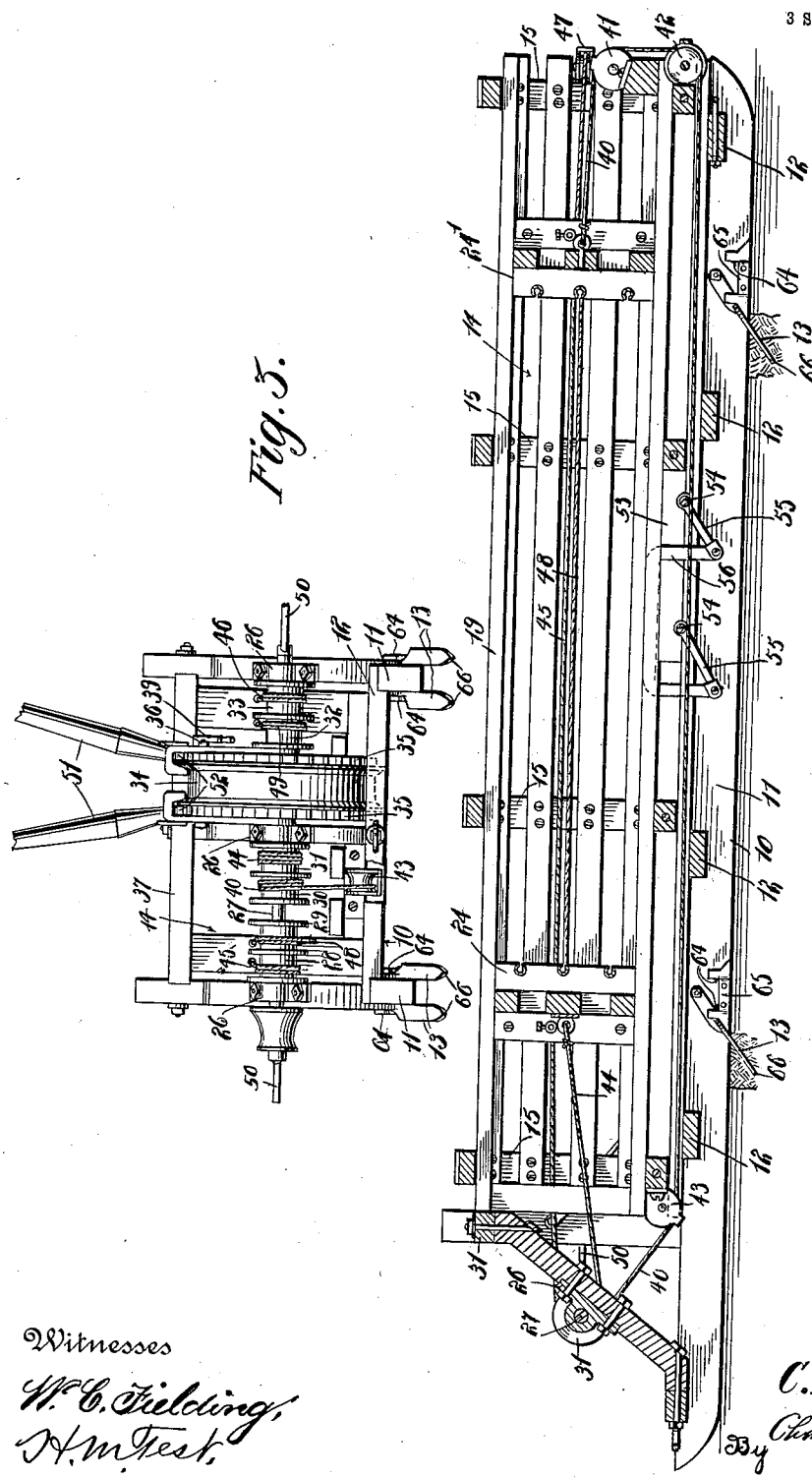

UNITED STATES PATENT OFFICE.

CHARLES E. NABB, OF NORTH BEND, OREGON.

BALING-PRESS.

1,096,051.

Specification of Letters Patent. Patented May 12, 1914.

Application filed November 19, 1912. Serial No. 732,334.

*To all whom it may concern:*

Be it known that I, CHARLES E. NABB, a citizen of the United States, residing at North Bend, in the county of Coos, State of Oregon, have invented certain new and useful Improvements in Baling-Presses; and I do hereby declare the following to be a full, clear, and exact description of the invention, such as will enable others skilled in the art to which it appertains to make and use the same.

This invention relates to improvements in hay presses.

The principal object is to provide a simple hay press with novel means for operating the pressure heads. This and other objects will be apparent from the following description and with particular reference to the accompanying drawings.

Figure 1:
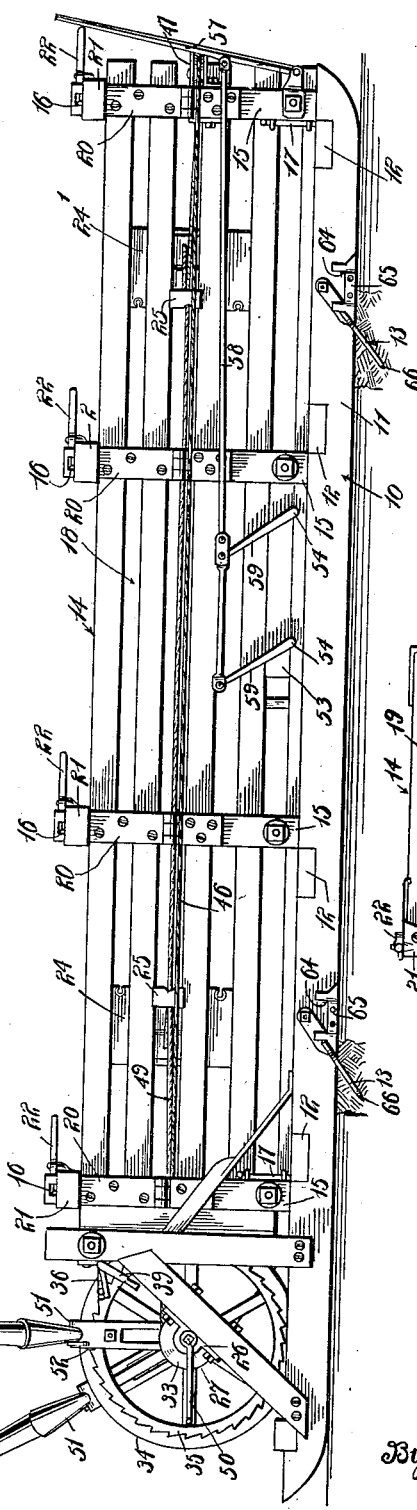
Figure 5:
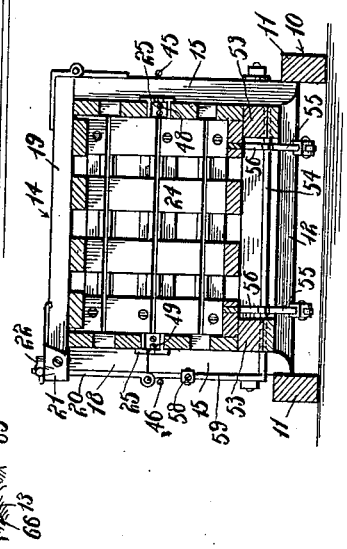

In the drawings: Figure 1 is a side elevation, Fig. 2 is a top plan view, Fig. 3 is an end elevation, Fig. 4 is a vertical longitudinal sectional view on the line 4—4 of Fig. 2, Fig. 5 is a vertical transverse sectional view on the line 5—5 of Fig. 2.

Referring particularly to the accompanying drawings, my device comprises a sledded base 10, the runners 11 of which are connected to the cross bars 12. Pivoted on each of the runners are the ground engaging points 13, which hold the device when operated by a horse.

An elongated slatted box 14 is disposed on the sledded base, and includes uprights 15, having their lower ends projecting below the bottom of the box and spaced apart so as to engage against the inner faces of the runners and the cross bars 12. Pivoted bolts 17, having hooked ends, are mounted on the uprights and are adapted to so turn their hooked ends to engage under the cross bars 12 that they prevent the box being raised from the base. One side of the box has a hinged section 18, which is adapted to be let down to remove the bale, the top of the box 19 being also hinged and adapted to be raised when the bale is to be removed. On the hinged side 18 are a plurality of vertically extending plates 20, each of which is provided with an opening 16 in its upper end, the upper end being adapted to be received in a socket member 21 on the lid 19. A pivoted hook 22, carried by the lid 19 is adapted to be swung to engage the hooked end in the said opening and above the said socket member, whereby the side section, and the lid are held in closed position.

Slidable in the box are the compressor heads 24 and 24'. Each of the compressor heads has on each side, the outwardly extending grooved brackets 25, which engage between the longitudinal slats of the side of the box and are positively guided thereby. Journaled in suitable brackets 26 on one end of the sledded base is a shaft 27, which carries a plurality of smaller drums indicated respectively by the reference characters 28, 29, and 30, 31, 32 and 33, and between the smaller drums 31 and 32 is a large drum 34, on each side of which is formed a ratchet member 35. A pivoted pawl 36 is mounted on the upright frame 37, of the base and engages the said ratchet members, a lever 39 being pivoted adjacent the pawl, for moving the pawl into and out of engagement with the ratchet teeth. Secured at one end to the outer face of the compressor head 24' is a cable 40, said cable extending under the frame after first passing over the pulleys 41 and 42 in one end of the brackets, and has its opposite end passing over a pulley 43, where it is attached to the smaller drum 30. A cable 44 is secured at one end to the compressor head 24, and has its opposite end secured to the smaller drum 31. The cables are wound on the drums 30 and 31, in the same direction. The cables 45 and 46 are secured to one side of the compressor head 24, and extend through the brackets on the sides of the other compressor head 24', said cable passing around pulleys 47 in the end of the box. The cables 48 and 49 are attached to the compressor head 24 and secured at their other ends to the drums 29 and 32. On each end of the shaft 27 is a crank handle 50, by means of which the same may be operated manually.

Pivotally carried by the shaft 27 on each side of the large drum, are the levers 51 which levers carry the spring-pressed pawls 52 for engagement with the ratchet member. When a horse is used a cable is wound upon the large ratchet drum the shaft 27 will be rotated as the horse pulls on the cable and operates the compressor heads to form a bale, the crank handle bars 51 being removed.

To the blocks 53 in the bottom of the box 14 and centrally of its length, are mounted the transverse shafts 54 which carry the arms 55. To these arms are secured the bale raising members 56. A lever 57 is pivotally mounted on one end of the box and is connected by means of the link 58 to the arms 59 on the outer ends of said shafts for raising and lowering said bale lifter.

The ground engaging members 13 are pivoted to the runners 11, and are limited in their two opposite movements by the stop shoulders 64 on the plates 65 carried by the runner. The members 13 have the pointed ground piercing blades 66.

What is claimed is:

1. In a device of the class described, a sledded base, a removable baling box carried by the base, a transverse shaft at one end of the base, a plurality of winding drums mounted on the shaft, a large drum mounted on the shaft intermediate the first named drums, ratchet teeth carried by the large drum, pawl carrying levers mounted on the shaft and engaging the ratchet teeth, longitudinally movable opposed compressor heads in the box, cables wound on the smaller drums and connected to the compressor heads for moving the compressor heads toward and away from the center of the box.

2. In a device of the class described, a sledded base, a shaft carried at one end of the base, winding drums mounted on the shaft, a box mounted on the sledded base, the top and one side of the box being hinged thereto, interlocking fastening means between the top and side, means for detachably holding the box to the base and means within the box and connected to the drum for compressing hay therebetween.

In testimony whereof, I affix my signature, in the presence of two witnesses.

CHARLES E. NABB.

Witnesses:
 A. H. DERBYSHIRE,
 W. AHLOKOG.

---

Copies of this patent may be obtained for five cents each, by addressing the "Commissioner of Patents, Washington, D. C."